June 2, 1942.　　　　P. N. SMITH　　　　2,284,850
SPEED INDICATING APPARATUS
Filed April 19, 1939
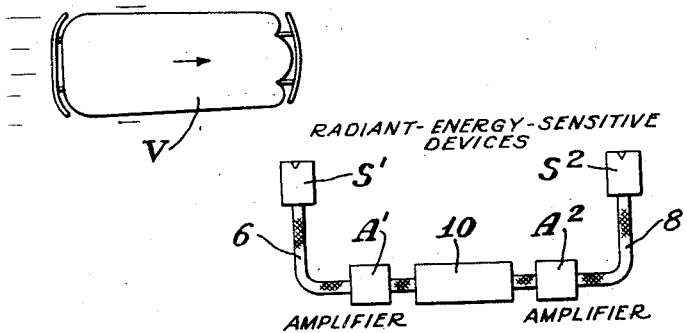
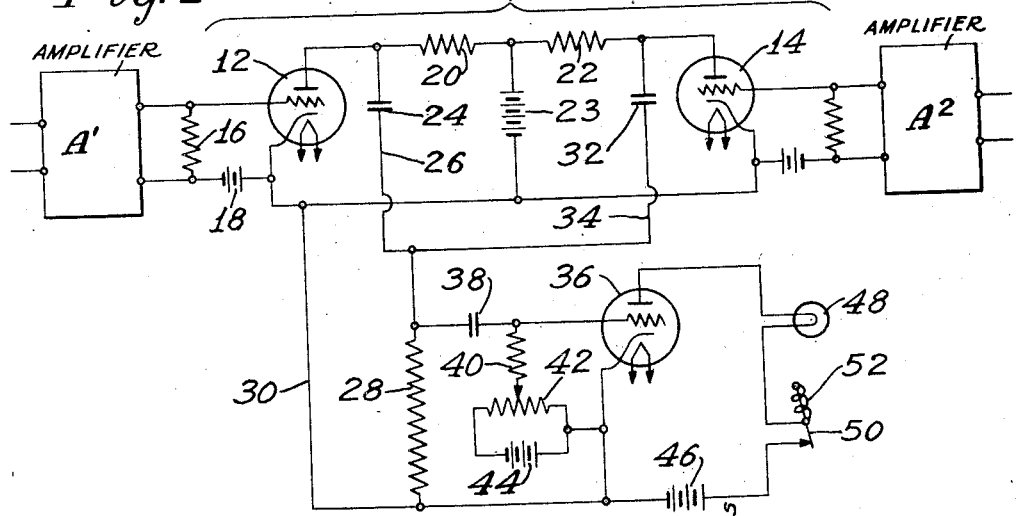
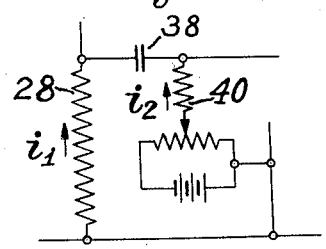
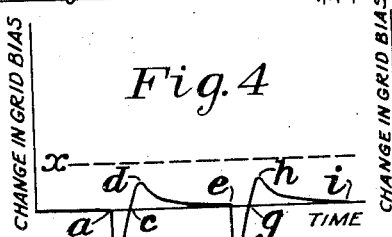
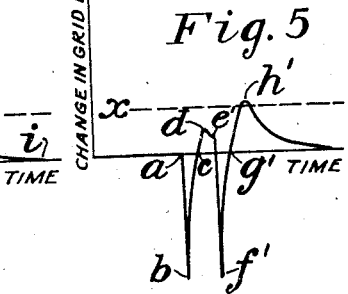
Witness
Charles J. Olson
Inventor
Philip N. Smith
by his attorneys
Fish, Hildreth, Cary & Jenney Patented June 2, 1942

2,284,850

UNITED STATES PATENT OFFICE 2,284,850

SPEED INDICATING APPARATUS

Philip N. Smith, Melrose Highlands, Mass., assignor to Hammond V. Hayes, Boston, Mass.

Application April 19, 1939, Serial No. 268,800

4 Claims. (Cl. 177—311.5)

The present invention relates to speed-indicating apparatus.

At the present time a need exists for a device to indicate the instantaneous speed of a moving object, particularly for measurement of vehicle speeds from an observing station beside the highway. The measurement of speed depends upon a measurement of the time required for the vehicle to pass along a given base line. When measurements of time are made by mechanical devices, it is usually necessary to employ a long base line to get reasonable accuracy. A short base line is, however, desirable in order that a true indication of instantaneous speed may be obtained, and it is the object of the present invention to provide a simple and reliable apparatus for giving an accurate indication of elapsed time, and hence of speed, with relation to a base which may be only a few feet long.

In the specific embodiment to be presently described, the invention is used in apparatus constructed for vehicle speed observation, and arranged to give a suitable signal whenever a passing vehicle exceeds a predetermined speed. Since the time of travel along the base line may be only a few hundredths of a second, it is essential to insure that the measuring apparatus itself involves no time lag that would vitiate the result. According to one feature, the invention involves two discharge circuits, in which electrical discharges are successively initiated by the passage of the vehicle past two spaced observation points. Means are provided for causing a summation of the effects of the instantaneous discharges. The maximum value of this summation is determined by the time elapsed between initiation of the discharges, and is utilized to give an indication of excess speed, when such maximum is greater than a critical value for which the apparatus has been previously set.

Another feature contemplates the provision of two gaseous discharge tubes, each controlled by a photo-sensitive device responsive to the passage of the moving object. The discharge tubes are utilized to initiate the discharges by which the indication is obtained. The apparatus is free of mechanically moving parts and is capable of indicating excess speeds with a high degree of accuracy.

Other features of the invention comprise certain novel combinations and arrangements of parts herein described and particularly defined in the claims.

In the accompanying drawing Fig. 1 is a diagrammatic plan view of the invention as used for indicating the speed of a passing vehicle; Fig. 2 is a diagram of the electrical circuit; Fig. 3 is a detail diagram of a part of the circuit; and Figs. 4 and 5 are representative curves illustrating the operation of the system.

In Fig. 1 a vehicle V is shown proceeding along a highway from left to right. Alongside the highway and spaced a fixed distance apart are two radiant-energy-sensitive devices $S'$ and $S^2$, which may be either ordinary photoelectric cells or radiometers of the type disclosed in the patents to Hayes No. 1,954,204, granted April 10, 1934, and Hall No. 2,115,578, granted April 26, 1938. When photoelectric cells are used, two sources of light designated $L'$ and $L^2$ are placed at the opposite side of the highway and focused on the respective cells in such a manner that a passing vehicle intercepts the two beams successively. If radiometers of the Hayes and Hall type are employed, no activating light sources are necessary since these instruments are operated by the radiant energy emitted from the passing vehicle itself. The radiant-energy-sensitive devices, whatever their nature, are connected by cables 6 and 8 through amplifiers $A'$ and $A^2$ with the operating circuit indicated generally at 10 in Fig. 1.

As shown in Fig. 2 the operating system includes two gaseous discharge tubes 12 and 14, having their input circuits connected with the outputs of the amplifiers $A'$ and $A^2$, respectively. The tubes 12 and 14 are preferably of the gas or vapor triode type commonly known in the trade as Thyratrons. As is well known, these are hot-cathode tubes having a characteristic such that no plate current flows so long as the grid voltage is negative and greater than a certain critical value. When the grid becomes less negative than the critical value, the tube becomes conducting and continues to conduct current, regardless of changes of grid potential, so long as the anode potential remains above a certain positive value.

The output of the amplifier $A'$ is connected across a resistor 16 which, together with the source of biasing potential 18 forms the input circuit to the Thyratron 12. The input circuit is connected between the cathode and the grid or control element. The amplifier $A^2$ is similarly connected to the input circuit of tube 14. The anodes of the tubes 12 and 14 are connected through high resistances 20 and 22, respectively, with the positive terminal of a direct-current voltage source 23, the negative terminal of which is connected to the cathodes of the tubes.

Each Thyratron is provided with an output or discharge circuit. The output circuit of tube 12 comprises a condenser 24 connected by a wire 26 in series with a resistor 28, which in turn is connected to the cathode by a lead 30. The output circuit of tube 14 comprises a condenser 32 connected by a wire 34 with the resistor 28. The resistor 28 is therefore common to both output circuits. The particular values of the condensers 24 and 32 and of the resistor 28 are not critical. Generally, the condensers may be 1 mfd. each and the resistor may be 50,000 ohms, although the system may be calibrated for other values. Both the condensers and the resistor should be of types to maintain their values accurately under substantially all conditions.

The resistor 28 forms part of an input circuit for a third Thyratron 36. The complete input circuit of the tube 36 also includes a coupling condenser 38 and a grid resistor 40, the latter being adjustably connected to a potentiometer 42, across which is connected a source of biasing potential 44. The output circuit of the tube 36 includes a battery 46, a device generally indicated as a signal device 48, and a switch 50.

The connections of the various potential sources are shown in diagrammatic form and it will be understood that a single power supply may be used for all the units in accordance with well-known practice. For simplicity, the heater connections of the several tubes are omitted.

Under normal circumstances, when the system is inactive the control electrodes of the several tubes have a sufficient negative bias to prevent the passage of any anode current. The condensers 24 and 32 are charged to the potential of the source 23. If now a vehicle comes within the field of the device $S'$, the resulting impulse applied through the input circuit to the grid of tube 12 reduces the negative voltage on the grid sufficiently to cause the tube to become conducting. The condenser 24 then discharges through a circuit traced as follows: from the upper terminal of the condenser through the tube 12, lead 30, the input circuit of tube 36, and wire 26 back to the other terminal of the condenser. The total discharge current divides, as shown in Fig. 3, into a current $i_1$ through the resistor 28 and a current $i_2$ through the grid resistor 40 and coupling condenser 38. The current $i_2$ is of importance in determining the bias of the third Thyratron 36.

Fig. 4 is a representative plot against time of the instantaneous values of change of grid potential caused by changes in the current $i_2$. Since the change in grid bias is proportional to the current, the explanation of the operation of the system may be made in times of either current or potential, and the graph may be considered as representing either quantity. It is zero up to the point $a$, at which time the discharge of the condenser 24 through the tube 12 starts. The initial value of $i_2$ at the moment of starting of the discharge is indicated at $b$. The current $b$ is plotted in the negative direction since, as shown in Fig. 3, it is in the direction to increase the negative bias on the tube 36. The current then decays rapidly according to a complex law depending on the relations of the capacitances 24 and 38 and the resistances 28 and 40. This flow of current builds up a charge on the coupling condenser 38. The voltage across the condenser 38, due to the charge thereon, opposes the flow of current until a time is reached when the current $i_2$ becomes zero, as indicated by the point $c$. Then the condenser 38 discharges through a local circuit formed by the resistor 42, the potentiometer and the resistor 28 all in series. Through the resistor 40, therefore, the current reverses and is plotted in the positive direction in Fig. 4. The positive current rises to a maximum indicated by the point $d$ and then decays toward the zero axis. The maximum change of grid potential in the positive direction is also indicated by the point $d$. The characteristics of the tube are such, however, that the maximum value $d$ is insufficient to make the tube become conducting. The setting of the potentiometer 42 is such that the tube can become conducting only at a higher critical bias, which is represented by the dotted line $x$ in Fig. 4.

Assume now that the vehicle comes within the field of the device $S^2$, so that the condenser 32 is caused to discharge through the tube 14, and further assume that the vehicle is traveling at a low rate of speed so that the discharge of the condenser 32 does not start until the current $i_2$ has decayed nearly to zero, as indicated by the point $e$ on Fig. 4. The discharge current from condenser 32 causes currents $i_1$ and $i_2$ to flow in the input circuit, exactly as previously described. In the plot of Fig. 4, the current $i_2$ simply repeats from point $e$ a curve $efghi$ exactly similar to $abcde$. The maximum point $h$ likewise does not rise above the critical value $x$; therefore, at no time does the tube 36 become conducting.

The conditions existing when the vehicle is passing at greater than the critical predetermined speed are indicated in Fig. 5. Upon passing the device $S'$, the condensers 24 and 38 discharge in the manner described above and the current $i_2$ goes to the same large negative value $b$, and to the same positive maximum $d$, and then starts to decay from the point $d$. However, the speed of the vehicle is such that it comes into the field of the device $S^2$ before the coupling condenser 38 has fully discharged. Therefore, at some point $e'$ on the decay curve the discharge current from the condenser 32 causes the current $i_2$ to go immediately to a large negative value $f'$, and from the point $f'$ it decays toward zero $(g')$. During this flow the coupling condenser 38 is further charged. The total charge thus built up on the coupling condenser is greater than before because of the residual charge which remained on the condenser at the point $e'$. In other words, the condenser assumes a total charge determined by the summation of the residual charge and the additional charge caused by the flow of the second transient current. Consequently, when the condenser 38 discharges, the positive current through the resistor 40 rises to a value indicated by $h'$ which is higher than the point $x$, and which is therefore sufficient to cause the tube 36 to become conducting.

Whether or not the peak $h'$ exceeds the critical value $x$, depends on how far the first discharge of the blocking condenser 38 has been allowed to proceed down its decay curve before the second condenser 32 imposes its discharge current on the input circuit. The critical value $x$ necessary to render the tube 36 conducting is itself capable of adjustment by means of the potentiometer 42. A suitable calibration having been made, the potentiometer may be set for any desired critical speed.

When the tube 36 becomes conducting because of the critical value $x$ having been exceeded, the signal device 48 is operated by the source 46.

The circuit constants are not critical. It should be observed, however, that the discharges of the condensers 24 and 32 through the input circuit of the tube 36, are in circuits of a relatively small time constant, whereas the discharge of the coupling condenser 38 is in a loop circuit of relatively large time constant. Thus, the portion $a$, $b$, $c$ of Fig. 4 is of short duration, whereas the portion $d$, $e$ representing the discharge current of the coupling condenser, is relatively slower. Although the analysis of the circuit is not simple, it may be stated that the time constant of the first discharge depends on the values of the resistances 28 and 40 in parallel, and the time constant of the coupling condenser discharge depends on the values of these resistances in series.

The operation of the system may be explained more generally as follows: The charges on condensers 24 and 32 represent a storage of electrical energy. The discharge of the first condenser 24 results in the transfer of a definite portion of its energy to the coupling condenser 38. The energy thus transferred is stored or trapped in the coupling condenser, but dissipates at a definite rate depending on the values of capacitance and resistance in the local discharge circuit. The discharge of the second condenser 32 then results in the transfer of a definite portion of its energy to the condenser 38. The energy thus transferred as a result of the second discharge adds to the energy which happens at the time to be remaining in the coupling condenser. Whether or not the tube 36 becomes conducting depends on the instantaneous maximum energy in the coupling condenser, and this depends on the time interval between the sequential energy transfers. Operation of the signal device indicates that the predetermined speed is being exceeded and failure of operation indicates that the vehicle is within the speed limit.

After the vehicle passes, the grids of the tubes 12 and 14 again go negative. The condensers having discharged, the voltages on the anodes are now insufficient to maintain the tubes in the conducting state. The condensers 24 and 32 are then charged from the source 23 through the resistors 20 and 22, respectively, in readiness for a succeeding operation. It will be observed that the resistors 20 and 22 should be of sufficiently high resistance so that the source 23 is unable to apply to the anodes a voltage high enough to maintain conduction after the condensers have discharged. In one installation which has been found satisfactory, the source 23 is 90 volts and the resistors 20 and 22 are one-half megohm each.

After the tube 36 has become conducting, due to the passage of the vehicle at a speed greater than the predetermined limit, conduction would continue regardless of changes in the input circuit if the output circuit should remain closed. To restore the tube 36 to its normal condition, it is necessary to open the output circuit momentarily, and to this end the switch 50 is provided. This switch may be arranged for manual operation following operation of the signal, but preferably is designed to open the output circuit automatically soon after conduction has been established. Various forms of devices may be used for this purpose, but the simplest one is a thermostatic switch including a heating coil 52 in the output circuit. The heating of the coil opens the switch, whereupon the switch again closes, but conduction through the tube is not thereafter established until the tube 36 is again actuated by sequential discharges of the condensers 24 and 32.

The device 48, which is herein termed a signal device, may be of any suitable form, such as an audible signal, a lamp, a counter, or any device designed to be actuated for any useful purpose upon passage of an object at greater than a predetermined speed.

It will be observed that the system is completely symmetrical with respect to the radiant-energy-sensitive devices $S'$ and $S^2$, and hence will operate in the same manner for objects traveling in either direction.

With a base line of six feet between the radiant-energy-sensitive devices, a vehicle passing at fifty miles an hour causes successive discharges of the tubes 12 and 14 in a time of about 0.08 seconds, and the apparatus must operate with sufficient accuracy to distinguish reasonably between vehicles traveling in excess of that speed and those traveling at a lower speed. One of the principal advantages of the present invention is that it involves no mechanical inertia and substantially no electrical lag, so that the segregation of vehicles traveling below or above the critical speed may be made with high accuracy.

It will be understood that although the system has been described in connection with speed indications of vehicles, it may be used to give indications of the speed of any moving object. In other respects, also, the invention is not to be considered as limited to the particular embodiment shown and described but may be varied within the scope of the appended claims.

Having thus described the invention, I claim:

1. Speed indicating apparatus comprising two devices, each responsive to the passage of an object thereby and spaced a definite distance apart, a different discharge circuit controlled by each of the responsive devices, an electrical energy storing device, means whereby a fixed amount of electrical energy is transferred to said energy storing device from the corresponding discharge circuit each time a responsive device responds to the passage of an object, a dissipative circuit connected across the energy storing device, and signal means operated when the instantaneous maximum energy of the energy storing device exceeds a critical value, said dissipative circuit being timed so that the maximum energy in said energy storing device is below said critical value when the speed of said object is below a predetermined value and is above said critical value when said speed is above said predetermined value.

2. Speed indicating apparatus comprising two devices, each responsive to the passage of an object thereby and spaced a definite distance apart, a different discharge circuit controlled by each of the responsive devices, an electrical energy storing device, means whereby a fixed amount of electrical energy is transferred to said energy storing device from the corresponding discharge circuit each time a responsive device responds to the passage of an object, a dissipative circuit connected across the energy storing device, an electrical discharge device having a control element, means for applying to the control element a potential determined by the energy of the storing device, the electrical discharge device having provision for becoming conducting when said potential exceeds a critical value, and signal means operated by the electrical discharge device, said dissipative circuit being timed so that the potential applied to the control element is below said critical value when the speed of said object is below a predetermined value and said potential is above said critical value when said speed is above said predetermined value.

3. Speed indicating apparatus comprising two devices, each responsive to the passage of an object thereby and spaced a definite distance apart, a different discharge circuit controlled by each of the responsive devices, a condenser, means whereby a fixed amount of electrical energy is transferred to said condenser from the corresponding discharge circuit each time a responsive device responds to the passage of an object, a dissipative circuit connected across the condenser, and signal means operated when the instantaneous maximum energy of the condenser exceeds a critical value, said dissipative circuit being timed so that the maximum energy in said condenser is below said critical value when the speed of said object is below a predetermined value and is above said critical value when said speed is above said predetermined value.

4. Speed indicating apparatus comprising two devices, each responsive to the passage of an object thereby and spaced a definite distance apart, a different discharge circuit controlled by each of the responsive devices, a condenser, means whereby a fixed amount of electrical energy is transferred to said condenser from the corresponding discharge circuit each time a responsive device responds to the passage of an object, a dissipative circuit connected across the condenser, an electrical discharge device having a control element, means for applying to the control element a potential determined by the energy of the condenser, the electrical discharge device having provision for becoming conducting when said potential exceeds a critical value, and signal means operated by the electrical discharge device, said dissipative circuit being timed so that the potential applied to the control element is below said critical value when the speed of said object is below a predetermined value and said potential is above said critical value when said speed is above said predetermined value.

PHILIP N. SMITH.